United States Patent [19]

Ohmura

[11] 4,445,293
[45] May 1, 1984

[54] FOLDING GUIDE ASSEMBLY

[75] Inventor: Ryuichi Ohmura, Shizuoka, Japan

[73] Assignee: Fuji Kogyo Co., Ltd., Shizuoka, Japan

[21] Appl. No.: 305,042

[22] Filed: Sep. 23, 1981

[30] Foreign Application Priority Data

Oct. 14, 1980 [JP] Japan .................... 55-144074

[51] Int. Cl.³ ............................................ A01K 87/04
[52] U.S. Cl. .................................................... 43/24
[58] Field of Search .................. 43/24; 242/157 R; 248/293, 240.7, 240, 289.1

[56] References Cited

U.S. PATENT DOCUMENTS

| 695,426 | 3/1902 | Brockett | 248/240.4 |
| 4,070,785 | 1/1978 | Hawk | 242/157 R X |

FOREIGN PATENT DOCUMENTS

| 1052497 | 1/1954 | France | 43/24 |
| 1088082 | 3/1955 | France | 43/24 |
| 394023 | 8/1973 | U.S.S.R. | 43/24 |

Primary Examiner—Nicholas P. Godici
Assistant Examiner—Charles L. Willis
Attorney, Agent, or Firm—Cantor and Lessler

[57] ABSTRACT

An improved folding line guide assembly comprises a guide ring, a pair of supporting legs extending from the guide ring and resiliently opened at lower ends thereof, and a mounting member having a guide slot slidably receiving lower ends of said supporting legs.

5 Claims, 13 Drawing Figures

FIG. 1
FIG. 3
FIG. 2
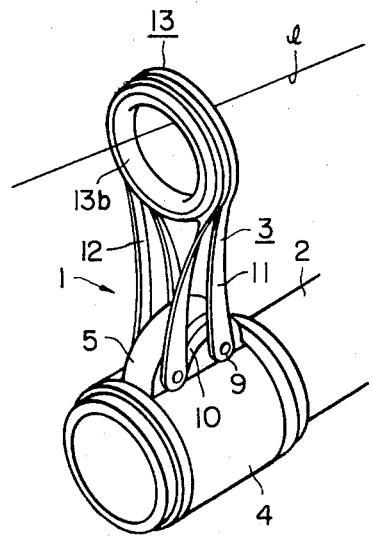
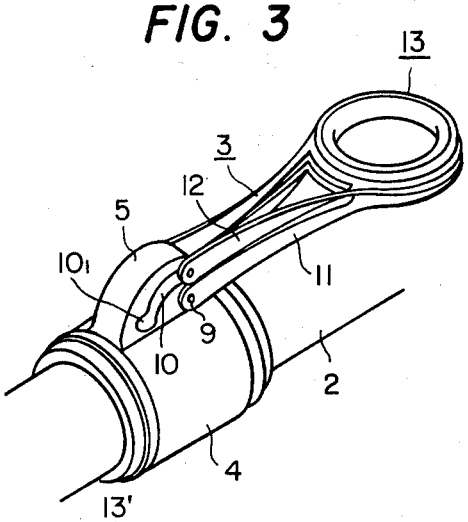
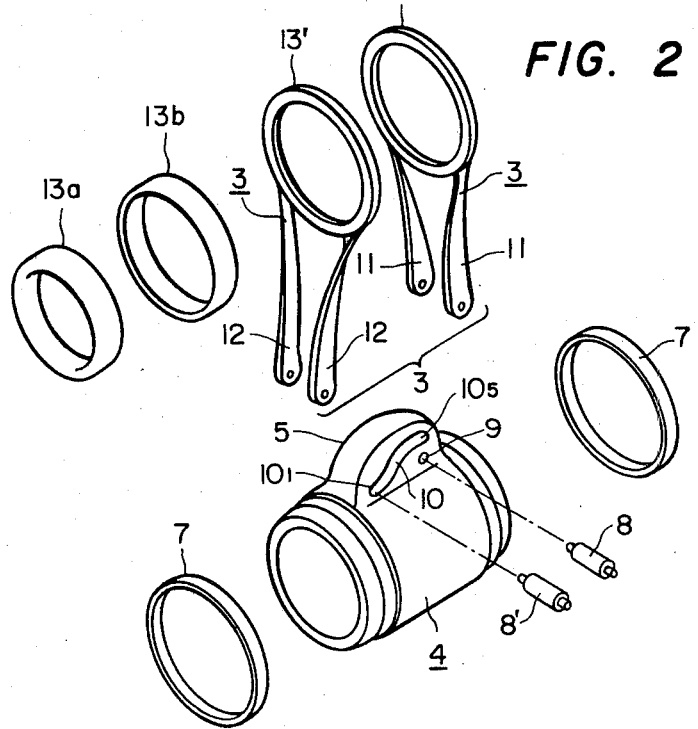

FOLDING GUIDE ASSEMBLY

BACKGROUND OF THE INVENTION

The present invention relates to an improved folding guide assembly, and more particularly to a folding guide arrangement which can be kept in an upright or horizontal position with respect to a fishing rod.

Various types of folding guide assemblies have been proposed. They have, however been deficient in many respects. There have been problems of strength, maintenance, manufacture cost, durability, etc.

SUMMARY OF THE INVENTION

According to the present invention, there is provided an improved folding guide assembly which comprises a combination of resilient supporting legs and a guide slot in a mounting member for receiving the lower ends of the legs.

BRIEF DESCRIPTION OF THE DRAWINGS

The objects and features of the present invention will now become apparent from a reading of the following detailed description in conjunction with the accompanying drawings, in which:

FIG. 1 is a perspective view of the folding line guide assembly according to the present invention in use, FIG. 2 is an exploded view of FIG. 1, FIG. 3 is a perspective view of the guide assembly kept in the folded position.

DETAILED DESCRIPTION OF THE INVENTION

Figure 6:
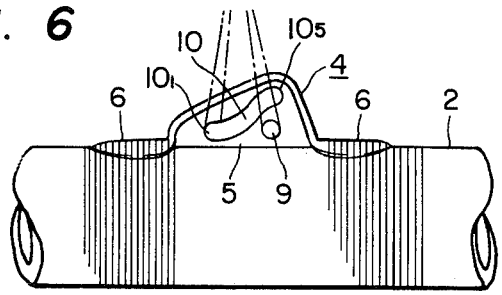
FIG. 6 is a side view of another embodiment of the mounting member of the instant guide assembly, FIGS. 7A and 7B ae side views showing different embodiments of the guide slot.

Reference will now be concretely made to a preferred embodiment of the present invention. Referring to FIG. 1, there is shown a line guide assembly in use, generally shown at 1, which is attached to a fishing rod 2 to guide a fishing line 1. The line guide assembly 1 generally comprises a guide member 3 for a fishing line and a mounting member 4 to be mounted on the fishing rod. Referring to the mounting member 4, it includes an integral support 5 for carrying a pair of supporting legs. In the embodiment illustrated in FIGS. 1 through 4, the mounting member 4 is of a tubular type that is fitted over the fishing rod 2, but is not limited thereto. For instance, when the mounting member 4 is secured to the fishing rod by means of winding threads, it may be provided with an extension 6 as shown in FIG. 6.

It is noted that the mounting member 4 may be made of a plastic or a metal. In FIG. 2, reference numeral 7 stands for a reinforcing annular ring.

Figure 4A:
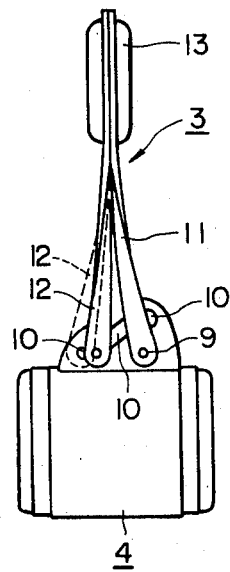
FIGS. 4A to 4C are side views illustrative of the sequence of the guide assembly disposed from the upright to the folded position.
Figure 4B:
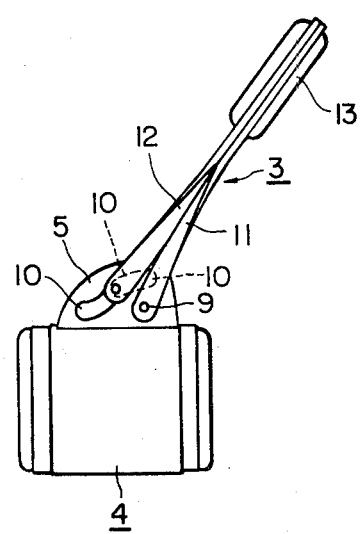
Figure 4C:
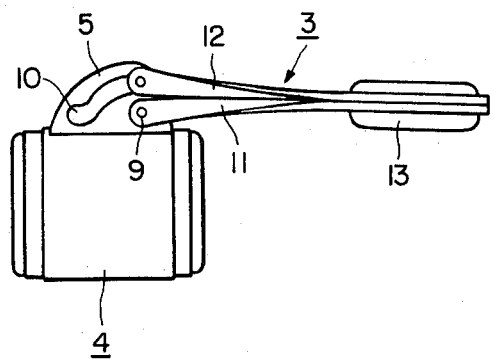
Figure 5:
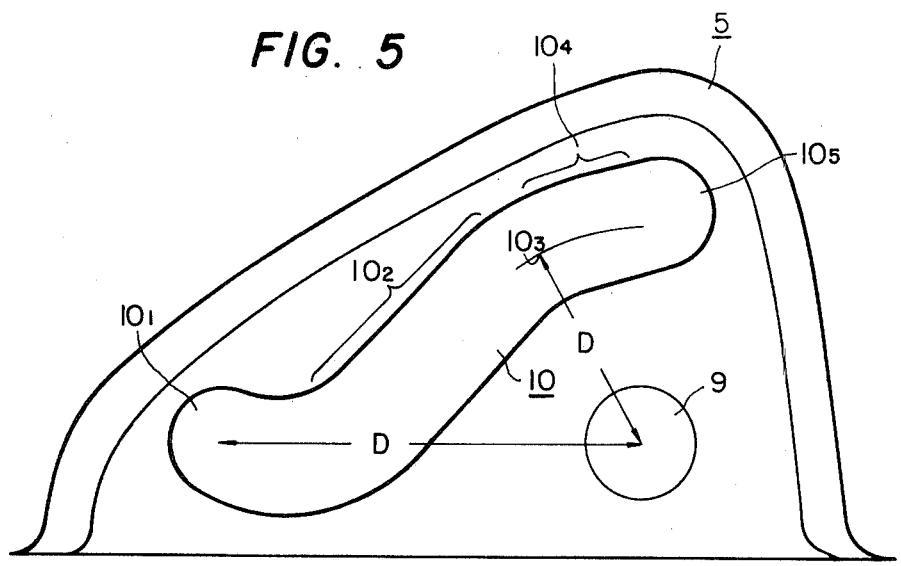
FIG. 5 is a side view showing, on an enlarged scale, a guide slot in the instant guide assembly.
Figure 9A:
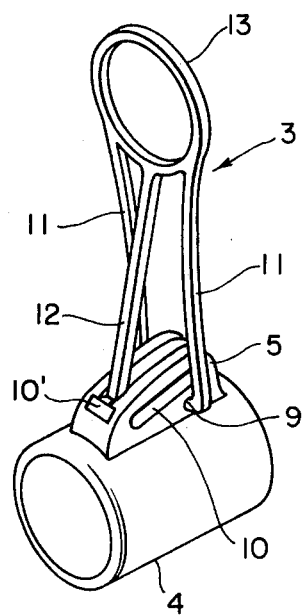
FIG. 9A is a perspective view showing another embodiment wherein the guide member of the instant guide assembly is formed of a single plate.
Figure 9B:
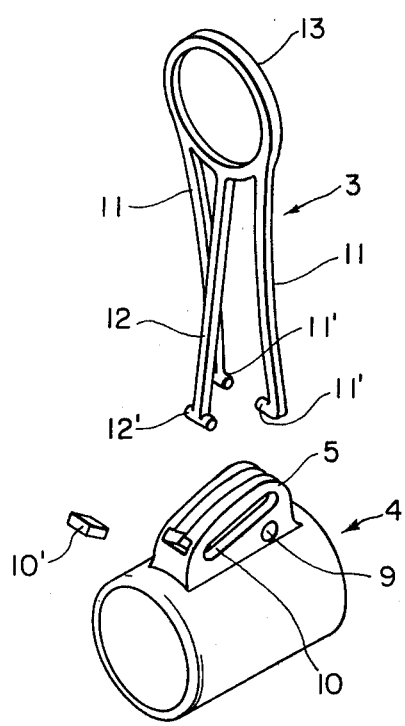
FIG. 9B is an exploded view of FIG. 9A.

The support 5 is integral with the mounting member 4, and is provided with a pivot hole 9, a pin 8 and a guide slot 10 which extends upwardly from a point located forward of, and at the same level as the pivot hole 9, as shown on an enlarged scale in FIG. 5. The left-hand end of the guide slot 10 is farthest from the pivot hole 9, and serves to retain the guide member 3 in its upright position. This end is indicated as $10_1$. The guide slot 10 extends toward the pivot hole 9 from the end $10_1$, and thence extends upwardly to form a guide portion $10_2$. In the upper terminal end of the guide portion $10_2$ is a transition point $10_3$ which is located from the pivot hole 9 at the shortest distance D. Past the transition point $10_3$, the guide portion $10_2$ slants more gradually and is followed by a second guide portion $10_4$ leading to the right-hand end $10_5$ which serves to retain the guide member in its folded position. The line guide member 3 carried by the mounting member comprises a two pairs of supporting legs 11 and 12 in spaced relation and a guide ring 13 attached to the upper ends of supporting legs 11 and 12. In the embodiment as shown in FIGS. 1 through 4, the guide member comprises a face-to-face combination of, e.g., two sheets formed by pressing (hereinafter termed the materials). The materials for the guide member 3 are formed on the upper portion with a guide ring frame 13' and on the lower portion with a pair of supporting legs 11,11 (or 12,12) which are twisted 90°. With regard to the guide ring frames 13', the guide rings of the two materials are then joined to each other in face-to-face relation by means of eyelets, brazing or spot welding so that the supporting legs 11 and 12 are resiliently movable away from each other. It is noted that the guide ring 13 may be formed in known manner by fitting a hard guide member 13a formed of, e.g., ceramic, sapphire, silicon carbide or the like into the joined frames 13' directly or through a flexible shock ring 13b. The guide ring may be of other suitable known construction. It is also understood that, while the foregoing embodiment has been described using two sheets of materials, however, the present invention is not restricted to such a guide member. What is essential is that the supporting legs are resiliently opened at their lower ends. That is to say, the guide member 3 may be formed of a single sheet of metal, as shown in FIGS. 9A and 9B. The upper portion of the guide member then forms a guide ring 13, from the lower center of which extends a forward supporting leg 12 and from diametrical portions of which a pair of rearward supporting legs 11 extend virtually in parallel. The rearward and forward supporting legs are resiliently opened at their lower ends. Pin-like pieces 11' and 12' are integrally formed on the lower ends of the supporting legs, instead of using the pins 8 and 8'. Corresponding to the guide member 3 of the above-mentioned construction, the mounting member 4 includes a leg support 5 having in its center a guide slot 10 which is of reverse T-shape in transverse section and inclined as viewed from either side. The pin-like piece 12' is fitted loosely into this slot. A pivot hole 9 is located at the lower portion of the leg support in spaced relation to the slot 10, and is resiliently fitted with the pin-like pieces 11' formed on the lower ends of the rearward supporting legs 11. It is noted that reference numeral 10' stands for a plug for closing an opening of the slot 10 after insertion of the pin-like piece 12'.

Referring to the coupling structure of the guide member 3 and the mounting member 4, said legs 11 are rotatably fixed at the lower ends to the pivot hole 9 by means of pin 8, while a pin 8' is attached to the lower end of the other leg 12 in such a manner that it passes through the slot 10 and is loosely movable therein.

The line guide assembly constructed according to the present invention operates as follows. Reference will first be made to the assembly in its upright position and then to that in the folded position. In the upright position, the pin 8' attached to the supporting leg 12 is located at the end $10_1$ as shown by broken lines in FIG. 4, so that the supporting legs 11 and 12 define an equilateral triangle as viewed from the side. Since the guide slot 10 extends horizontally from the end $10_1$ and thence upwardly, leading to the first guide portion $10_2$, the guide member is kept in the upright position with the aid of a resilient force exerted by the supporting legs 11 and 12 spaced away from each other.

To fold the guide member from the upright to the folded position, a push is given to the lower ends of the supporting legs 12 to permit the pin 8' to be out of engagement with the end $10_1$ of the slot 10. The pin 8' of the supporting legs 12 is then slid through the guide portion $10_2$ (FIG. 4B) to the end $10_5$, while the other supporting legs 11 pivotally rotate around the pivot hole 9. In this way, folding of the guide member to the folded position is accomplished (FIG. 4C). In the course of the folding movement, the guide member 3 tends to stay in the vertical position until the pin 8' moves past the transition point $10_3$ of the slot 10, after it has passed through the transition point, the guide member 3 moves by itself to the folding position.

In the foregoing embodiment, the supporting legs 11 and 12, are symmetrical since they are made of identical materials; however, the present invention is not restricted to such a symmetrical arrangement.

Figure 8:
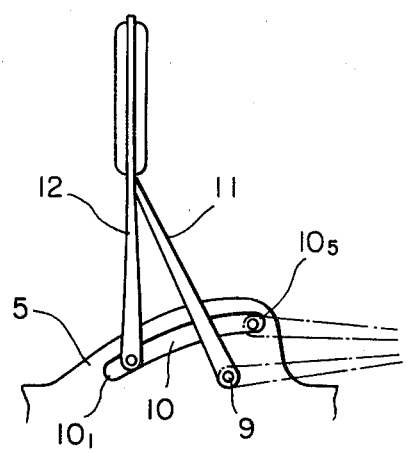
FIG. 8 is a side view illustrative of another embodiment of the supporting legs.

In the embodiment of FIG. 8, the guide assembly according to the present invention will be asymmetrical.

Figure 7A:
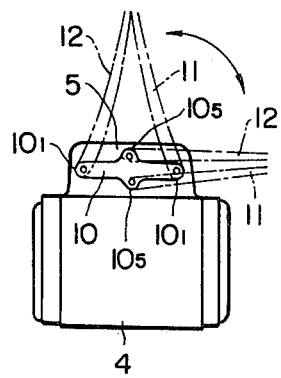
Figure 7B:
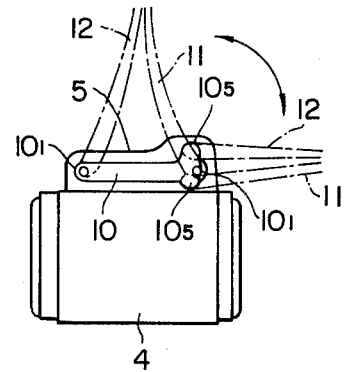

In the foregoing embodiment, the supporting legs 12 have been described as being loosely fitted into the guide slot 10, and supporting legs 11 being supported by the pivot hole 9. In the present invention, however, it is also contemplated that all the supporting legs are loosely fitted into the guide slot. To this end, the guide slot may be formed into a cruciate shape or T-shape, as shown in FIG. 7A or 7B. In both embodiments, reference numeral $10_1$ represents the end serving to retain the guide member in the upright position, and $10_5$ the end serving to retain the guide member in its horizontal position.

As mentioned above, the present invention provides an improved folding line guide assembly with feature of durability and simple construction.

What is claimed is:

1. An improved folding line guide assembly for a fishing rod, said guide assembly comprising a guide ring, a pair of rear supporting legs and at least one front supporting leg depending from the guide ring, said rear and front legs being resiliently separable from each other at the lower ends thereof, and a mounting member having a guide slot for slidably receiving the lower end of said front supporting leg, said rear supporting legs being pivotally received in a pivot hole in the mounting member while said at least one front supporting leg is slidably fitted at its lower end in the guide slot of the mounting member.

2. An improved folding line guide assembly as recited in claim 1, wherein a midportion of said guide slot is disposed at a distance closer to the pivot hole of the mounting member than are the ends of the guide slot.

3. An improved folding line guide assembly as recited in claim 1 or 2, wherein each of a pair of line guide member halves having a guide ring half and the front and rear supporting legs, respectively, is integrated with the other at the guide rings in face-to-face relation.

4. An improved folding line guide assembly as recited in claim 1, wherein said at least one front supporting leg comprises a pair of front supporting legs.

5. An improved folding line guide assembly as recited in claim 1, comprising one front supporting leg.

* * * * *